Patented Aug. 29, 1939

2,171,305

UNITED STATES PATENT OFFICE 2,171,305

VULCANIZATION OF RUBBER

Marion W. Harman, Nitro, W. Va., assignor, by mesne assignments, to Monsanto Chemical Company, St. Louis, Mo., a corporation of Delaware No Drawing. Original application January 22, 1932, Serial No. 588,227. Divided and this application June 7, 1935, Serial No. 25,513

2 Claims. (Cl. 18—53)

The present invention relates to a process for vulcanization of rubber and similar products and to the products obtained thereby, and is particularly directed to the acceleration of the vulcanization step by employing in that step the reaction product of a mercapto-aryl-thiazole, for example an alkali metallic salt of mercapto-benzo-thiazole, and a halogenated alkyl carbonyl containing compound.

It is preferred that the present class of accelerating materials be employed in conjunction with a basic organic nitrogen containing accelerating compound, preferably a guanidine, for example diphenyl guanidine, to form a mixed accelerator.

One of the preferred class of compounds, for example the reaction product of mono chlor acetone and the sodium salt of mercapto-benzo-thiazole, has been prepared according to the following manner:

Substantially 0.1 of a mol (18.9 parts) of the sodium salt of mercapto-benzo-thiazole was dissolved in a suitable solvent, for example 80 parts by weight of ethyl alcohol, and substantially 0.1 of a mol (9.3 parts) of mono chlor acetone added slowly thereto at room temperature. After the reaction was complete, the sodium chloride formed was filtered off and the filtrate added to a weak alkaline solution, for example sodium carbonate solution, whereupon, after filtering and washing the material thereby precipitated with water, a good yield of the preferred accelerator was obtained in the form of a solid having a melting range of 64 to 67° C.

The product prepared as described was incorporated in a typical gum stock and found to possess accelerating properties. Preferably, however, the material is employed in conjunction with a basic organic nitrogen containing accelerating compound. Thus, a rubber stock was compounded in the well known manner comprising

| | Parts |
|---|---|
| Pale crepe rubber | 100 |
| Zinc oxide | 5 |
| Sulfur | 3 |
| Diphenyl guanidine | 0.6 |
| Reaction product of substantially equimolecular proportions of mono chlor acetone and the sodium salt of mercapto-benzo-thiazole | 0.4 |

The rubber stock, after curing in a press in the well known manner, on testing was found to possess the following modulus and tensile characteristics:

Table I

| Cure | | Modulus of elasticity in lbs/in.² at elongations of— | | | Tensile at break in lbs/in.² | Ultimate elongation, percent |
|---|---|---|---|---|---|---|
| Time, minutes | Pounds steam per square inch | 300% | 500% | 700% | | |
| 20 | 10 | 90 | 130 | 300 | 1660 | 1050 |
| 30 | 10 | 126 | 208 | 648 | 2360 | 950 |
| 30 | 20 | 179 | 403 | 1580 | 3605 | 860 |
| 45 | 20 | 217 | 525 | 2210 | 4175 | 830 |
| 60 | 20 | 241 | 638 | 2700 | 4200 | 790 |
| 90 | 20 | 264 | 756 | 3055 | 4705 | 780 |

The data set forth in Table I show that the preferred class of accelerators when activated by a basic organic nitrogen containing accelerating compound possess very desirable accelerating properties.

Another of the preferred class of rubber vulcanization accelerators comprises the reaction product of chloracetophenone and a mercapto-benzo-thiazole, for example the sodium salt of mercapto-benzo-thiazole. One method whereby this material has been prepared follows:

Substantially 0.1 mol (18.9 parts) of the sodium salt of mercapto-benzo-thiazole was dissolved in a suitable quantity of water and substantially 0.1 mol (15.4 parts) of chloracetophenone dissolved in a small amount of an organic solvent, for example acetone, added slowly thereto with cooling. The light yellow precipitate comprising the reaction product was filtered off and washed with an alkaline solution so as to eliminate any unreacted mercapto-benzo-thiazole. The product prepared in the manner described was obtained in good yield and melted at 106 to 109° C. The reaction product of the sodium salt of mercapto-benzo-thiazole and chloracetophenone when employed alone in a typical rubber stock was found to possess accelerating properties. It is preferable, however, that said reaction product be employed in conjunction with a basic organic nitrogen containing rubber vulcanization accelerator. Thus a rubber stock was compounded in the well known manner comprising

|  | Parts |
|---|---|
| Pale crepe rubber | 100 |
| Zinc oxide | 5 |
| Sulfur | 3 |
| Diphenyl guanidine | 0.6 |
| Reaction product of substantially equi-molecular proportions of chloracetophenone and the sodium salt of mercapto-benzo-thiazole | 0.4 |

The rubber stock thus compounded was vulcanized by heating in a press in the well known manner, and the cured rubber stock after testing was found to possess the following tensile and modulus characteristics:

Table II

| Cure | | Modulus of elasticity in lbs/in.$^2$ at elongations of— | | | Tensile at break in lbs/in.$^2$ | Elongation at break, percent |
|---|---|---|---|---|---|---|
| Time, minutes | Pounds steam per square inch | 300% | 500% | 700% | | |
| 20 | 10 | 78 | 133 | 294 | 1350 | 900 |
| 30 | 10 | 105 | 200 | 550 | 2230 | 950 |
| 30 | 20 | 182 | 368 | 1503 | 3725 | 875 |
| 45 | 20 | 200 | 531 | 2200 | 4390 | 830 |
| 60 | 20 | 236 | 655 | 2870 | 4470 | 790 |
| 90 | 20 | 259 | 747 | 3350 | 4700 | 770 |

The data set forth in Table II show clearly that the preferred class of compounds form an important group of rubber accelerators when employed in conjunction with a basic organic nitrogen containing vulcanization accelerator to form a mixed accelerator.

The reaction product of substantially equi-molecular proportions of chloracetophenone and the sodium salt of mercapto-benzo-thiazole has also been employed in a tread stock.

As other examples of the preferred class of accelerating compounds, the following materials have been prepared in a manner similar to that hereinbefore set forth.

(a) Reaction product of substantially equi-molecular proportions of the sodium salt of mercapto-benzo-thiazole and chloracetanilid having a melting range of 113–121° C.

(b) Reaction product of substantially equi-molecular proportions of chloracetamid and the sodium salt of mercapto-benzo-thiazole having a melting range of 142–144° C.

(c) Reaction product of substantially equi-molecular proportions of the sodium salt of mercapto-benzo-thiazole and chloraceto-chloranilide having a melting range of 115–118° C.

(d) Reaction product of substantially equi-molecular proportions of chloracet-p-nitranilide and the sodium salt of mercapto-benzo-thiazole having a melting range of 150–152° C.

(e) Reaction product of substantially equi-molecular proportions of chloracet-o-toluidide and the sodium salt of mercapto-benzo-thiazole having a melting range of 145–149° C.

All of the above materials have been employed alone, but preferably are employed in conjunction with a basic organic nitrogen accelerator, in a typical rubber stock. As examples of their use in conjunction with a basic organic nitrogen containing accelerator, each of the above accelerators, (a), (b), (c), (d), and (e), were incorporated separately in a rubber stock comprising

|  | Parts |
|---|---|
| Pale crepe rubber | 100 |
| Zinc oxide | 5 |
| Sulfur | 3 |
| One of the preferred accelerators (a) to (e) inclusive | 0.4 |
| Diphenyl guanidine | 0.6 |

On testing strips of the above described stocks, vulcanized by heating in a press for different periods of time under temperatures given by different steam pressures, the tensile and modulus data obtained show that the preferred accelerators (a) to (e) inclusive, described above exhibit the accelerating properties of the class.

Other basic organic nitrogen containing vulcanization accelerators than diphenyl guanidine have been employed in conjunction with the preferred class of materials. Thus, diacetone amine and piperidine have been employed in a typical rubber stock in conjunction with the preferred class of accelerators, for example, the reaction product of substantially equi-molecular proportions of chloracetamid and the sodium salt of mercapto-benzo-thiazole, and found to be activators thereof.

Other mercapto-aryl-thiazoles than mercapto-benzo-thiazole may be reacted with a halogenated alkyl carbonyl containing compound. Thus, mercapto-tolyl-thiazole, mercapto-xylyl-thiazole, mercapto-naphthiazole and the like may be reacted with mono-chloracetone, dichloracetone, chlor methyl ethyl ketone, chloracetophenone, chloracetamide, chloracetanilid, chloracet-o-chloranilide, chloracet-p-nitranilide, chloracet-o-toluidide, chlor diethyl ketone and analogous compounds and the reaction products employed as rubber accelerators. Again, mercapto-benzo-thiazole, or a salt thereof, preferably an alkali metallic salt, may be reacted with chlormethyl ethyl ketone, dichlor acetone and chlor diethyl ketone and the reaction products employed as rubber vulcanization accelerators. Furthermore, other basic organic nitrogen containing accelerators than those hereinbefore set forth may be employed in conjunction with the preferred class of compounds as activators thereof. Thus, 2,4 diamino diphenyl amine, diortho-tolyl-guanidine and the like may be so employed.

The foregoing examples are to be illustrative only and not at all limitative of the invention. Other vulcanized products may be obtained by employing other compounding ingredients and other proportions of ingredients than those particularly set forth in the examples given.

The present application is a division of application Serial No. 588,227 filed by me January 22, 1932.

What is claimed is:

1. The process of treating rubber which comprises heating rubber and sulfur in the presence of a vulcanization accelerating product comprising a reaction product of substantially equi-molecular proportions of monochloracetamid and the sodium salt of mercapto-benzo-thiazole as a constituent thereof.

2. The vulcanized rubber product produced by heating rubber and sulfur in the presence of a vulcanization accelerating product comprising a reaction product of substantially equi-molecular proportions of monochloracetamid and the sodium salt of mercapto-benzo-thiazole as a constituent thereof.

MARION W. HARMAN.